United States Patent
Clashman et al.

(10) Patent No.: US 7,735,866 B2
(45) Date of Patent: Jun. 15, 2010

(54) GLOVE BOX ENERGY ABSORBING STRUCTURE

(75) Inventors: Lynn Marie Clashman, Superior Township, MI (US); Troy Doom, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 183 days.

(21) Appl. No.: 11/945,427

(22) Filed: Nov. 27, 2007

(65) Prior Publication Data

US 2009/0134654 A1    May 28, 2009

(51) Int. Cl.
B60R 21/045 (2006.01)
(52) U.S. Cl. ..................................... 280/752
(58) Field of Classification Search .............. 180/90; 188/377; 280/748, 752; 296/37.12, 70, 187.05
See application file for complete search history.

(56) References Cited

U.S. PATENT DOCUMENTS

| | | | |
|---|---|---|---|
| 5,273,314 A * | 12/1993 | Sakakibara | 280/752 |
| 5,370,417 A * | 12/1994 | Kelman et al. | 280/752 |
| 5,431,442 A | 7/1995 | Tomita et al. | |
| 5,865,468 A * | 2/1999 | Hur | 280/752 |
| 6,086,098 A * | 7/2000 | Reiter et al. | 280/752 |
| 6,135,495 A | 10/2000 | Redgrave et al. | |
| 6,601,902 B1 | 8/2003 | Rahmstorf et al. | |
| 6,793,246 B2 * | 9/2004 | Horsch | 280/752 |
| 6,866,294 B2 * | 3/2005 | Horsch et al. | 280/752 |
| 7,185,917 B2 | 3/2007 | Nagata et al. | |
| 7,338,075 B2 * | 3/2008 | Ellison et al. | 280/752 |
| 2005/0052011 A1 | 3/2005 | Best et al. | |
| 2005/0194773 A1 * | 9/2005 | Yamada et al. | 280/752 |
| 2006/0038389 A1 | 2/2006 | Ko | |
| 2006/0082116 A1 | 4/2006 | Riefe et al. | |
| 2006/0113781 A1 | 6/2006 | Dancasius et al. | |
| 2006/0208473 A1 | 9/2006 | Morris et al. | |
| 2006/0226645 A1 | 10/2006 | Iwasaki | |
| 2008/0093831 A1 * | 4/2008 | Ellison | 280/752 |

* cited by examiner

*Primary Examiner*—Paul N Dickson
*Assistant Examiner*—Robert A Coker
(74) *Attorney, Agent, or Firm*—Gifford, Krass, Sprinkle, Anderson & Citkowski, P.C.

(57) ABSTRACT

A glove box energy absorbing structure that does not use braces to attach to an instrument panel or instrument panel reinforcement is provided. The energy absorbing structure includes a selectively collapsible pillar proximate to a bottom region of an upper glove box and a selectively collapsible pillar as part of a top wall of a lower glove box. The selectively collapsible pillar of the lower glove box is oppositely disposed from and adjacent to the selectively collapsible pillar of the upper glove box. The two selectively collapsible pillars afford for engagement with each other and thereby afford for energy to be absorbed during an accident when the lower glove box is impacted by the knee of a passenger sitting in the front seat of a motor vehicle.

20 Claims, 2 Drawing Sheets

GLOVE BOX ENERGY ABSORBING STRUCTURE

FIELD OF THE INVENTION

The present invention relates generally to a glove box. More specifically the invention relates to an energy absorbing structure for a glove box.

BACKGROUND OF THE INVENTION

A glove compartment or glove box is a compartment typically present as part of a dashboard or instrument panel in a motor vehicle and is located above the front-seat passenger's foot well. The glove box can be used for storage of a number of different items such as gloves, the motor vehicle owner's manual, proof of insurance documents and the like. Given the location of the glove box being in front of a passenger traveling in the front seat of the motor vehicle, it is desirable that the glove box have energy absorbing capabilities in case of an accident.

Heretofore, glove boxes have typically used a brace or bracket to attach a glove box to an instrument panel reinforcement. The brace or bracket attaching the glove box to the instrument panel reinforcement absorbs energy if and when the glove box is impacted, for example by a passenger's knees during a sudden stop or collision. In addition, the glove box itself can absorb energy by deflecting or collapsing when impacted by a passenger's knees. Although the brace or bracket that attaches the glove box to the instrument panel reinforcement can absorb energy during a collision, an energy absorbing structure or structures that would eliminate the need for such braces could reduce hardware, cost and labor to attach the glove box to the instrument panel reinforcement. Therefore, such an energy absorbing structure or structures would be desirable.

SUMMARY OF THE INVENTION

A glove box energy absorbing structure that does not use a brace or bracket to attach to an instrument panel reinforcement is provided. The energy absorbing structure includes a selectively collapsible pillar attached to a bottom wall of an upper glove box and a selectively collapsible pillar as part of a top wall of a lower glove box. The selectively collapsible pillar of the lower glove box is oppositely disposed from and adjacent to the selectively collapsible pillar of the upper glove box. The two selectively collapsible pillars afford for engagement with each other and thereby afford for energy to be absorbed during an accident when the lower glove box is impacted by the knee of a passenger sitting in the front seat of a motor vehicle.

The upper glove box can include a front wall with an instrument panel reinforcement section that has a complementary shape with the outside surface of an instrument panel reinforcement. In this manner, the upper glove box is supported. The selectively collapsible pillar of the upper glove box has at least one wall section that extends in a direction away from the interior of the upper glove box. Likewise, the selectively collapsible pillar of the lower glove box has at least one wall section that extends in a direction away from the interior of the lower glove box. The sections of the selectively collapsible pillars that extend away from the interior of the respective glove box are oppositely disposed from and adjacent to each other. Thus when the lower glove box is impacted during a collision and moves in a generally forward direction, the selectively collapsible pillar of the lower glove box engages the selectively collapsible pillar of the upper glove box, and energy is absorbed by the lower glove box, upper glove box and energy absorbing structure without the need for braces or brackets attaching either of the glove boxes to the instrument panel reinforcement.

DETAILED DESCRIPTION OF THE INVENTION

The present invention includes an energy absorbing structure for a glove box. As such, the present invention has utility as a safety device for a motor vehicle.

The glove box energy absorbing structure includes an upper glove box and a lower glove box located generally below the upper glove box. The upper glove box has a bottom wall with a selectively collapsible pillar adjacent to and generally located below the bottom wall. The lower glove box has a top wall with a selectively collapsible pillar, the two selectively collapsible pillars of the upper glove box and the lower glove box affording an engaging structure therebetween. Upon impact of the lower glove box by a passenger sitting in the front passenger seat of a motor vehicle, the lower glove box moves in a generally forward direction and the selectively collapsible pillar of the lower glove box engages the selectively collapsible pillar of the upper glove box. Upon the engagement of the two selectively collapsible pillars, energy transferred from the passenger to the lower glove box is subsequently transferred to the upper glove box and the selectively collapsible pillars therebetween. The upper glove box, the lower glove box and both of the selectively collapsible pillars can be made from a material that deflects upon impact and thereby absorbs energy. In addition, each of the selectively collapsible pillars can absorb energy by collapsing upon each other and/or collapsing on itself.

Figure 1:
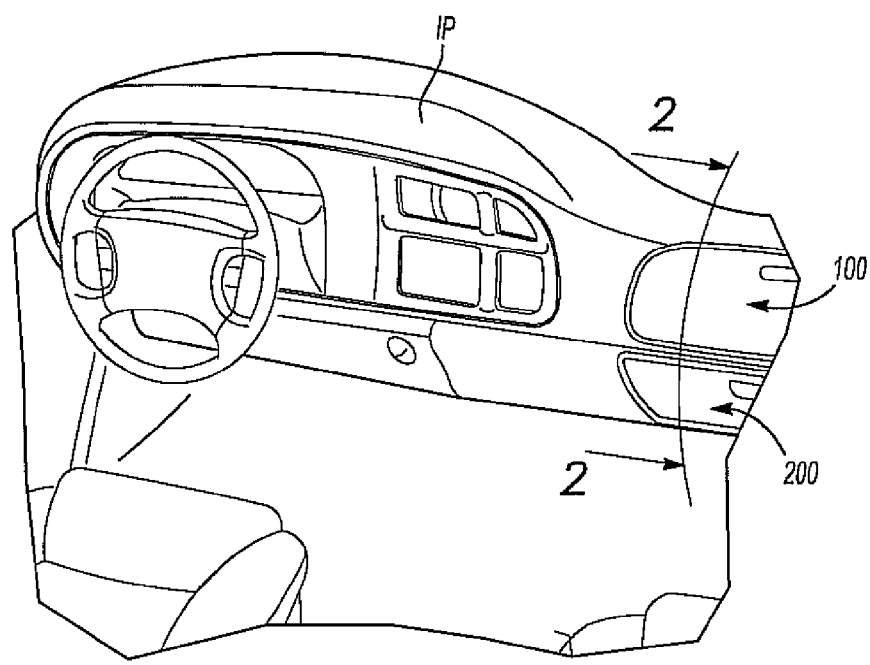
FIG. 1 is a perspective view of an instrument panel with an upper glove box and a lower glove box.
Figure 2:
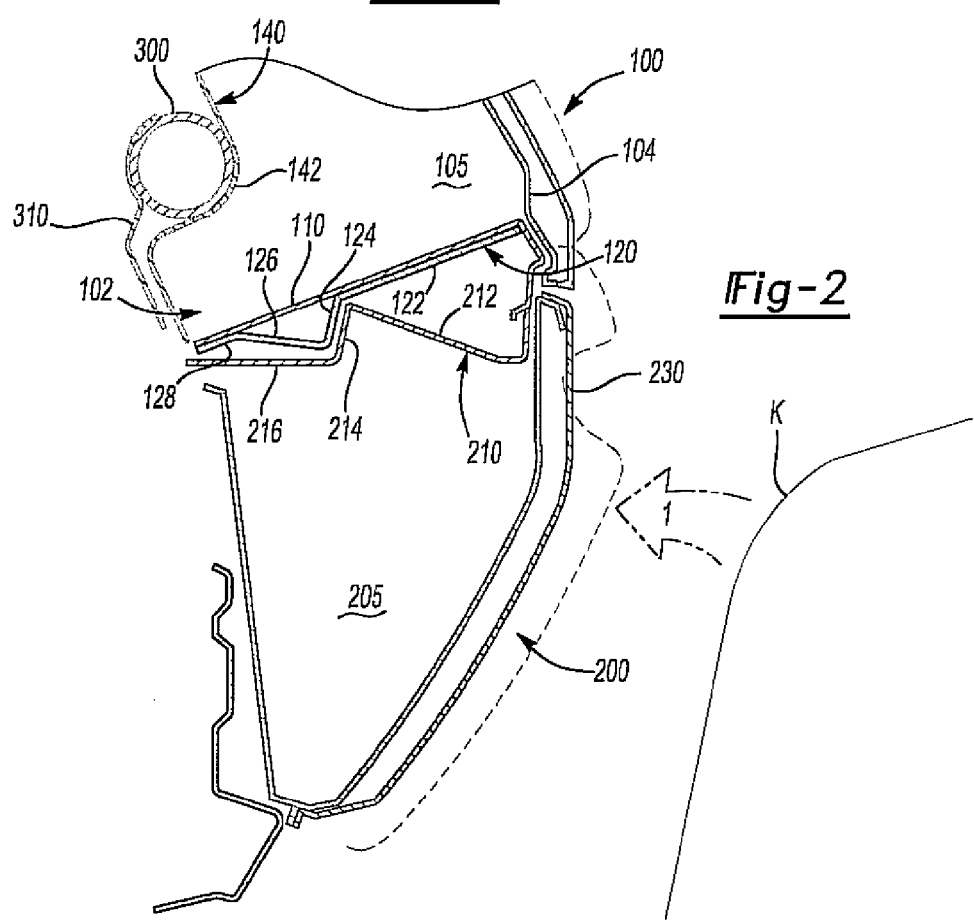
FIG. 2 is a cross-sectional side view of the section 2-2 shown in FIG. 1.

Turning to FIG. 1, an illustrative instrument panel IP having an upper glove box 100 and a lower glove box 200 is shown. A cross-sectional side view of the section 2-2 shown in FIG. 1 is illustrated in FIG. 2 where more detail of an embodiment of a glove box energy absorbing structure is shown.

The upper glove box 100 can have an optional bottom wall 110 that is located generally at a bottom region 102 of the glove box 100. Adjacent to and located generally below the bottom wall 110 proximate to the bottom region 102 is a selectively collapsible pillar 120. The selectively collapsible pillar 120 can include a first section 122, a second section 124 and a third section 126. Optionally, the selectively collapsible pillar 120 can include a fourth section 128. The selectively collapsible pillar 120 extends between a back wall 104 and a front wall 140, and has at least one section, e.g. the second section 124, which extends away from an interior 105 of the upper glove box 100. It is appreciated that more than one section of the selectively collapsible pillar 120 can extend away from the interior 105, for example the second section 124 and the third section 126.

The front wall 140 can include an instrument panel reinforcement section 142 that is complementary with and adjacent to an instrument panel reinforcement 300. In this manner, the upper glove box 100 is supported. The instrument panel reinforcement 300 can be in the form tubing, channel-bar, angle-bar and the like. Although not required, the instrument panel reinforcement 300 can include a protective counter measure bracket 310 that affords for engagement with the front wall 140 of the upper glove box 100.

The lower glove box 200 can include a top wall 210, the top wall 210 having a first section 212, a second section 214 and a third section 216. As illustrated in FIG. 2, the top wall 210 is in the form of a selectively collapsible pillar having at least one section 214 extending away from an interior 205 of the lower glove box 200. The second section 214 is adjacent to and generally spaced apart from the second section 124 of the selectively collapsible pillar 120 when the upper glove box 100 and the lower glove box 200 are in their at-rest positions. In addition, the second section 214 can be generally parallel to the second section 124. In some instances the second section 214 and the second section 124 extend across the entire width of the respective glove boxes 200 and 100. In other instances, the second section 214 and the second section 124 only extend across part of the width of the respective glove boxes 200 and 100.

Figure 3:
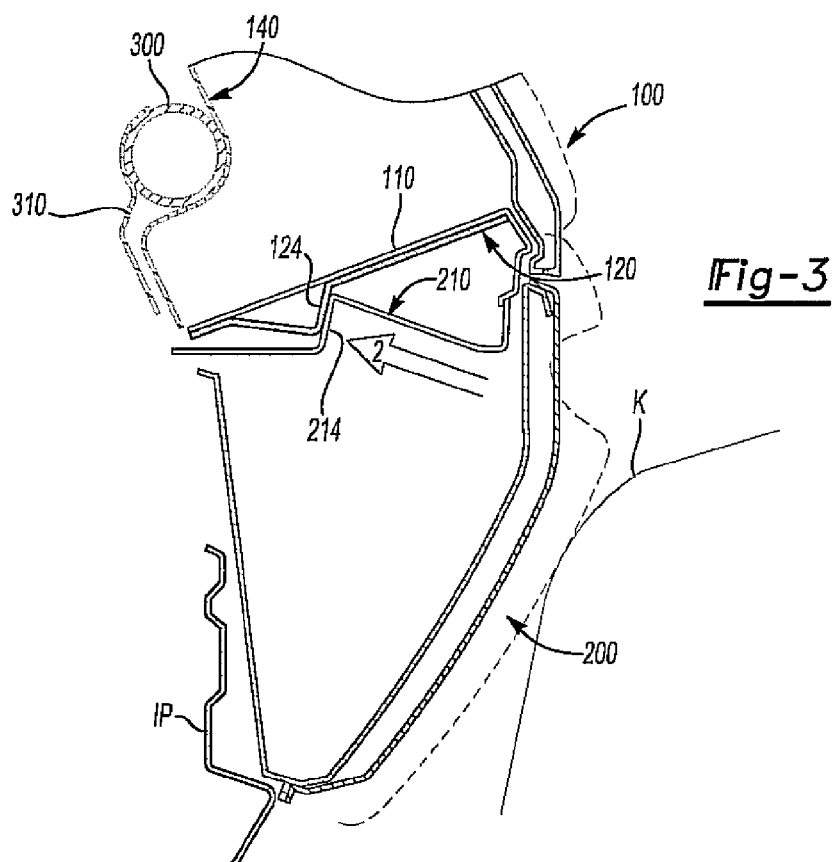
FIG. 3 is a cross-sectional side view of the embodiment shown in FIG. 2 illustrating the lower glove box moving in a generally forward direction.
Figure 4:
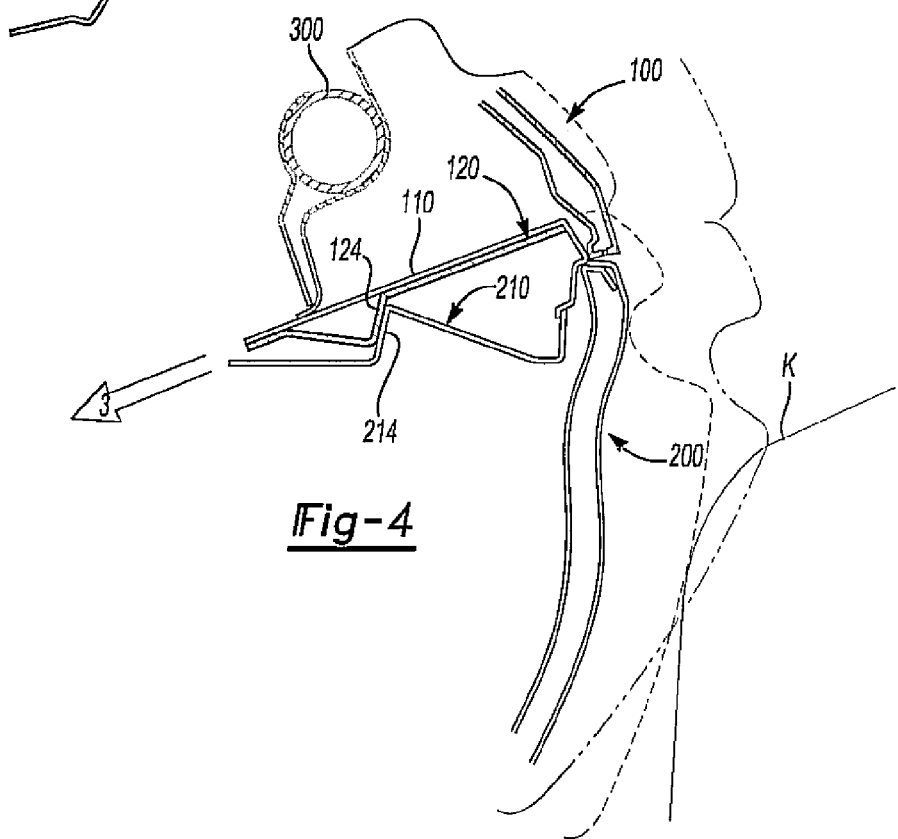
FIG. 4 is a cross-sectional side view of the embodiment shown in FIG. 2 illustrating the interaction of the upper glove box with the lower glove box.

When a motor vehicle having an embodiment of the inventive glove box energy absorbing structure disclosed herein experiences a sudden stop and/or collision, the knee K of a passenger can move in a first direction 1 as illustrated in FIG. 2. If the collision and/or sudden stop is severe enough, the knee K will impact the lower glove box 200, the lower glove box 200 subsequently traveling in a generally forward direction 2 as illustrated in FIG. 3. If the lower glove box 200 travels in the direction 2 a distance greater than the spaced apart distance between the at-rest second section 124 of the selectively collapsible pillar 120 and the second section 214 of the selectively collapsible pillar 210, the second section 214 will come into contact with and engage the second section 124. It is appreciated that energy from the lower glove box 200 moving in the second direction 2 can be transferred to the upper glove box 100 by the contact between the second section 214 and the second section 124. It is also appreciated that the engagement and interaction between the second section 214 and the second section 124 can absorb energy from the lower glove box 200 moving in the second direction 2.

Continued movement in a generally forward direction of the lower glove box 200 and forward movement of the upper glove box 100 can result in the two glove boxes moving in a generally forward direction 3. Depending upon the design and/or structural characteristics of the upper glove box 100, lower glove box 200 and their respective selectively collapsible pillars 120 and 130, each item can deflect and/or collapse to absorb energy. However, it is appreciated that independent of the deflection and/or collapsible characteristics of the various items, the energy absorbing structure with the selectively collapsible pillar 120 and the selectively collapsible pillar 210 affords for energy to be absorbed without the use of braces or brackets attaching the glove boxes to the instrument panel reinforcement 300.

It is appreciated that the upper glove box 100, the lower glove box 200 and their respective selectively collapsible pillars 120 and 130, can be made from any material known to those skilled in the art, illustratively including plastics, metals, alloys and the like. It is also appreciated that two glove boxes are not required in order for an energy absorbing structure described above to be operable. For example, the instrument panel IP could have a selectively collapsible pillar 120 that affords for engagement with the selectively collapsible pillar 210 of a single glove box. In this manner, an energy absorbing structure is provided for a motor vehicle.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A glove box energy absorbing structure for a motor vehicle, said energy absorbing structure comprising:
   an upper glove box having a bottom region with a selectively collapsible pillar proximate said bottom region; and
   a lower glove box located generally below said upper glove box and having a top wall with a selectively collapsible pillar, said selectively collapsible pillar of said lower glove box being oppositely disposed from and adjacent to said selectively collapsible pillar of said upper glove box;
   wherein said selectively collapsible pillar of said lower glove box engages said selectively collapsible pillar of said upper glove box when said lower glove box moves in a generally forward direction, for the purpose of providing a glove box energy absorbing structure.

2. The structure of claim 1, wherein said upper glove box selectively collapsible pillar has at least one wall section extending in a direction away from an interior of said upper glove box.

3. The structure of claim 2, wherein said lower glove box selectively collapsible pillar has at least one wall section extending in a direction away from an interior of said lower glove box.

4. The structure of claim 3, wherein said at least one wall section of said lower glove box selectively collapsible pillar is oppositely disposed from and adjacent to said at least one section of said upper glove box selectively collapsible pillar.

5. The structure of claim 4, wherein said at least one wall section of said lower glove box selectively collapsible pillar is generally parallel to said at least one section of said upper glove box bottom wall selectively collapsible pillar.

6. The structure of claim 5, wherein said at least one wall section of lower glove box selectively collapsible pillar extends across the width of said lower glove box.

7. The structure of claim 5, wherein said at least one section of said upper glove box selectively collapsible pillar extends across the width of said upper glove box.

8. The structure of claim 5, wherein said at least one wall section of said lower glove box selectively collapsible pillar extends across the width of said lower glove box and said at least one section of said upper glove box selectively collapsible pillar extends across the width of said upper glove box.

9. The structure of claim 1, further comprising:
   an instrument panel reinforcement with an instrument panel attached to said instrument panel reinforcement.

10. The structure of claim 9, wherein said upper glove box has a front wall with an instrument panel reinforcement section, said instrument panel reinforcement section having a shape complementary with an outside surface of said instrument panel reinforcement.

11. The structure of claim 10, wherein said instrument panel reinforcement section is adjacent to said outside surface of said instrument panel reinforcement.

12. The structure of claim 1, wherein said selectively collapsible pillars of said upper glove box and said lower glove box are made from a polymer.

13. A glove box energy absorbing structure for a motor vehicle, said energy absorbing structure comprising:
   an instrument panel reinforcement;
   an instrument panel attached to said instrument panel reinforcement;
   an upper glove box attached to said instrument panel and having a front wall with an instrument panel reinforcement section, said instrument panel reinforcement section having a shape complementary with an outside surface of said instrument panel reinforcement;
   said upper glove box also having a bottom wall and a selectively collapsible pillar adjacent to and generally located below said bottom wall, said selectively collapsible pillar having at least one wall section extending in a direction away from an interior of said upper glove box; and
   a lower glove box attached to said instrument panel, located generally below said upper glove box and having a top wall with a selectively collapsible pillar, said lower glove box selectively collapsible pillar having at least one wall section extending in a direction away from an interior of said lower glove box and being oppositely disposed from and adjacent to said at least one section of said upper glove box selectively collapsible pillar that extends in a direction away from the interior of said upper glove box.

14. The structure of claim 13, wherein said instrument panel reinforcement section is adjacent to said outside surface of said instrument panel reinforcement.

15. The structure of claim 13, wherein said at least one wall section of said lower glove box selectively collapsible pillar is generally parallel to said at least one section of said upper glove box selectively collapsible pillar.

16. The structure of claim 13, wherein said at least one wall section of said lower glove box selectively collapsible pillar extends across the width of said lower glove box.

17. The structure of claim 13, wherein said at least one section of said upper glove box selectively collapsible pillar extends across the width of said upper glove box.

18. The structure of claim 13, wherein said at least one wall section of said lower glove box selectively collapsible pillar extends across the width of said lower glove box and said at least one section of said upper glove box selectively collapsible pillar extends across the width of said upper glove box.

19. A glove box energy absorbing structure for a motor vehicle, said energy absorbing structure comprising:
   an instrument panel reinforcement;
   an instrument panel attached to said instrument panel reinforcement;
   an upper glove box attached to said instrument panel and having a front wall with an instrument panel reinforcement section, said instrument panel reinforcement section having a shape complementary with and adjacent to an outside surface of said instrument panel reinforcement;
   said upper glove box also having a bottom wall and a selectively collapsible pillar adjacent to and generally located below said bottom wall, said upper glove box selectively collapsible pillar having at least one wall section extending in a direction away from an interior of said upper glove box, said at least one wall section also extending the width of said upper glove box; and
   a lower glove box attached to said instrument panel, located generally below said upper glove box and having a top wall with a selectively collapsible pillar, said lower glove box selectively collapsible pillar having at least one wall section extending in a direction away from an interior of said lower glove box, extending the width of said lower glove box and being oppositely disposed from, adjacent to and generally parallel with said at least one section of said upper glove box selectively collapsible pillar that extends in a direction away from an interior of said upper glove box.

20. The structure of claim 19, wherein said selectively collapsible pillars of said upper glove box and said lower glove box are made from a polymer.

* * * * *